(12) United States Patent
Jansson et al.

(10) Patent No.: US 9,378,060 B2
(45) Date of Patent: Jun. 28, 2016

(54) RUNTIME CO-LOCATION OF EXECUTING LOGIC AND FREQUENTLY-ACCESSED APPLICATION DATA

(75) Inventors: Andreas Jansson, San Francisco, CA (US); Lars-Göran Forsberg, Karlstad (SE)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 656 days.

(21) Appl. No.: 13/596,346

(22) Filed: Aug. 28, 2012

(65) Prior Publication Data

US 2014/0067905 A1 Mar. 6, 2014

(51) Int. Cl.
G06F 15/16 (2006.01)
G06F 9/50 (2006.01)
G06F 9/48 (2006.01)

(52) U.S. Cl.
CPC ............ G06F 9/5033 (2013.01); G06F 9/4862 (2013.01)

(58) Field of Classification Search
None
See application file for complete search history.

(56) References Cited

U.S. PATENT DOCUMENTS

| | | | |
|---|---|---|---|
| 5,499,289 A * | 3/1996 | Bruno et al. | ............. 379/266.07 |
| 6,760,417 B1 | 7/2004 | Wallenius | |
| 7,136,913 B2 | 11/2006 | Linderman | |
| 7,483,438 B2 | 1/2009 | Serghi et al. | |
| 8,296,409 B2 | 10/2012 | Banerjee et al. | |
| 2002/0025795 A1 | 2/2002 | Sharon et al. | |
| 2002/0078167 A1 * | 6/2002 | Shavit et al. | ................... 709/217 |
| 2003/0028790 A1 | 2/2003 | Bleumer et al. | |
| 2004/0009762 A1 | 1/2004 | Bugiu et al. | |
| 2005/0245230 A1 | 11/2005 | Benco et al. | |
| 2007/0106801 A1 | 5/2007 | Jansson | |
| 2007/0143470 A1 | 6/2007 | Sylvain | |
| 2007/0250604 A1 * | 10/2007 | Wu et al. | ........................ 709/220 |
| 2008/0103923 A1 | 5/2008 | Rieck et al. | |
| 2008/0144536 A1 * | 6/2008 | Razdan et al. | ................. 370/261 |
| 2009/0268715 A1 | 10/2009 | Jansson | |
| 2009/0313438 A1 * | 12/2009 | Krishnaprasad et al. | ...... 711/133 |
| 2011/0082920 A1 | 4/2011 | Bhattacharya et al. | |
| 2012/0041970 A1 * | 2/2012 | Ghosh et al. | ................... 707/769 |
| 2013/0054822 A1 * | 2/2013 | Mordani et al. | .............. 709/228 |

OTHER PUBLICATIONS

Bea, WebLogic Network Gatekeeper, Architectural Overview, Version 3.0, 112 pages, Sep. 2007.
Chen et al., Applying SOA and Web 2.0 to Telecom: Legacy and IMS Next-Generation Architectures, IEEE, 6 pages, 2008.
Oracle Communication Services Gatekeeper Concepts and Architectural Overview, Release 4.1, Oracle, 94 pages, Jan. 2009.

* cited by examiner

Primary Examiner — Kristie Shingles
Assistant Examiner — Timothy Sowa
(74) Attorney, Agent, or Firm — Tucker Ellis LLP

(57) ABSTRACT

In accordance with various embodiments, systems and methods are provided for co-locating execution logic and state data in a distributed and clustered environment. Such a system can include a plurality of applications, executing on one or more application servers, including an event broker which identifies state data required by an actor, a database which identifies an application server where such state data is cached; and a co-location module which instantiates the actor on the application server where such state data is cached. The method includes identifying state data required by a transaction, identifying an application server where such state data is cached, instantiating execution logic for processing the transaction on the application server where such state data is cached, and executing said execution logic for processing the transaction on the application server where such state data is cached thereby providing predictable low execution latency.

20 Claims, 4 Drawing Sheets

RUNTIME CO-LOCATION OF EXECUTING LOGIC AND FREQUENTLY-ACCESSED APPLICATION DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to a system and method of co-locating execution logic and state data in a distributed and clustered environment to reduce execution latency.

BACKGROUND

Most applications need state data to process execution logic, for example subscriber state. For performance reasons such state data is often cached in memory of runtime processes to reduce the time to access this state data. The full data set is often too large to be cached locally on one machine and thus is read from some external source, such as a file-system or a database. Reading state data from a file-system or a database is relatively slow and adds latency.

Where applications are deployed in a distributed and clustered environment having multiple application servers to improve processing capabilities and provide high availability, the full data set can be cached in memory of runtime processes distributed across the environment. The full data set is, however, partitioned such that each application server caches only a data subset of the full data set. Thus, an application operating on one server may require state data cached on a remote server. The application must then fetch the required state data from the remote server where the state data is cached and/or read the state data from a file-system or a database, both of which add latency to the execution of the application.

SUMMARY

Embodiments of the present invention provide systems and methods which provide for co-locating execution logic and state data in a distributed and clustered environment to reduce execution latency. The execution logic is deployed in a distributed and clustered environment having multiple application servers to improve processing capabilities and provide high availability. The full data set of state data required by the execution logic is cached in memory of runtime processes distributed across the environment. The full data set is partitioned such that each application server caches only a data subset of the full data set. However, the system and method of the present invention locates the particular execution logic on the same application server as the data subset which includes the state data required by the execution logic. The application need not therefore fetch the required state data from a remote application server where the data may be cached and/or read the state data from a file-system or a database. The execution logic of the application can utilize instead data cached locally in runtime processes thereby reducing latency. Embodiments of the invention provide improved throughput and lower latency due to improved intelligence in the method by which execution logic is assigned to application servers.

An embodiment of the present invention provides a reduced execution latency system which includes a plurality of applications, executing on a plurality of application servers. The system includes a full data set which is partitioned such that each application server caches a data subset of the full data set. The system includes a database which identifies the location of cached data subsets across the application servers. The database is capable of identifying an application server where particular state data is cached. The system includes an event broker which instantiates applications in response to triggering events. The event broker includes a co-location module which identifies state data required by an application and utilizes the database to identify the application server where such state data is locally cached and directs the event broker to instantiate the application on the same application server thereby reducing execution latency.

An embodiment of the present invention provides a method for operating a system which includes a plurality of applications, executing on a plurality of application servers to reduce application execution latency. The method includes caching a full set of data in runtime processes distributed across the plurality of application servers, identifying state data required by a transaction, identifying the application server where such state data is cached, instantiating execution logic for processing the transaction on the application server where such state data is cached, and executing said application for processing the transaction on the application server where such state data is cached thereby reducing execution latency.

Other objects and advantages of the present invention will become apparent to those skilled in the art from the following detailed description of the various embodiments, when read in light of the accompanying drawings.

DETAILED DESCRIPTION

Figure 1:
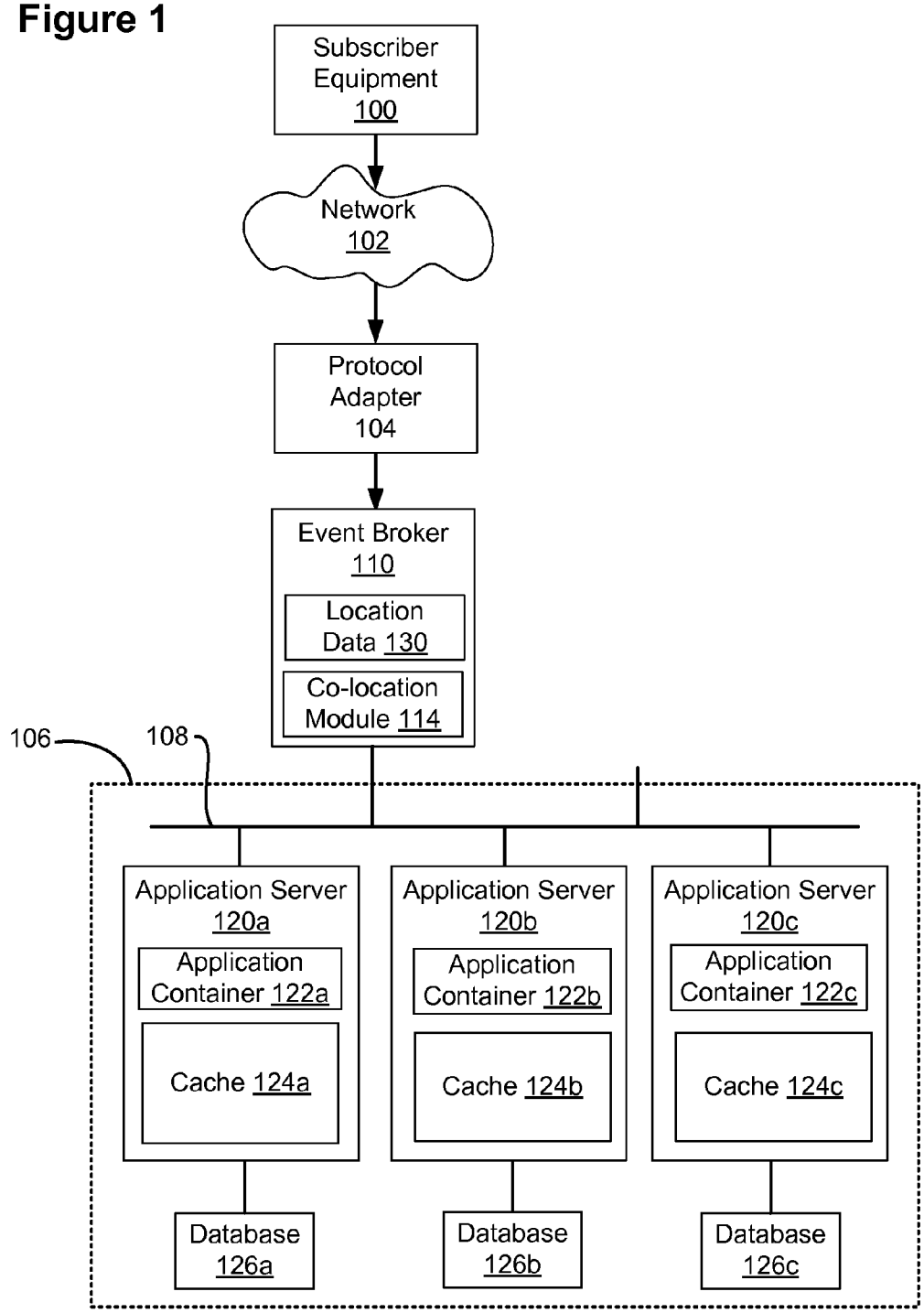
FIG. 1 shows a system for runtime co-location of executing logic and frequently-accessed application data, in accordance with an embodiment of the invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears. Likewise the first two digits in a four digit reference numeral.

Most applications need state data to process execution logic, for example subscriber state. For performance reasons such data is often cached in memory of runtime processes to reduce the time to access this state data. The full data set is often too large to be cached locally on one machine and thus is read from some external source, such as a file-system or a database. Reading state data from a file-system or a database is relatively slow and adds latency.

The present invention relates to a system and method operating on a distributed and clustered environment, for example a telecommunications network controller. The environment comprises a plurality of application servers (nodes) which are distributed and clustered. The execution logic is deployed across multiple application servers to improve processing capabilities and provide high availability. State data required by the execution logic is cached in memory of runtime processes distributed across the environment. The full data set is partitioned such that each application server caches only a data subset of the full data set. In embodiments of the invention, an event broker co-locates the particular execution logic on the same application server as the data subset which includes the state data required by the execution logic. The execution logic of the application can thus utilize state data cached locally in runtime processes thereby reducing latency.

Co-locating execution logic on the same application server as the data subset which includes the state data required by the execution logic reduces latency. In a telecommunications system both average latency and maximum latency are important factors. For example, it is desirable that a certain percentage of traffic must always be below some latency thresholds, for example 99% should be executed below a latency threshold of 50 milliseconds. Depending on the execution requirements of the system, the latency threshold can alternatively be 200, 100, 75, 25, and/or 10 milliseconds, and the percentage of traffic can alternatively be 90%, 95%, 98%, 99.5%, and 100%). Although a system having a simple cache and no specific co-location may have a good average response time, as soon as there is a cache miss (i.e. state data required for the execution logic is not present in local runtime services) the traffic incurs high latency (higher than the latency threshold) owing to the time required for network hops, to retrieve the state data from a remote server, or to retrieve the state data from a database. Co-locating execution logic on the same application server as the data subset which includes the state data required by the execution logic, in accordance with embodiments of the invention described herein, provides predictable latency and low latency for all requests thereby ensuring that substantially all requests are executed below a latency threshold (for example 50 milliseconds).

In a particular embodiment of the invention, co-location provides a feature by which to co-locate an actor/application comprising execution logic with some state data that is persisted in a runtime storage service. One purpose is to provide fast access to this state data by the actor/application. A goal is to co-locate the actor/application on the same virtual machine (in the same application container) as state data that it frequently accesses, thereby avoiding unnecessary network hops (and the resultant increased latency) to fetch data. To achieve this, co-location settings and co-location logic are provided.

FIG. 1 shows a system for runtime co-location of executing logic and frequently-accessed application data, in accordance with an embodiment of the invention. As shown in FIG. 1, subscriber equipment 100 connects to network 102. Network 102 is connected to a protocol adapter 104. In response to activities of subscriber equipment 100 and/or network 102, protocol adapter 104 publishes events to event broker 110. The event broker 110 can operate in the same location as the protocol adapter 104. Event broker 110 is connected to a distributed and clustered computing platform 106 which includes a plurality of application servers 120a, 120b, 120c connected by a network 108. Application servers 120a, 120b, 120c include application containers 122a, 122b, 122c, and runtime caches, 124a, 124b, 124c. Application containers 122b, 122c are capable of supporting execution of logic by applications. In some embodiments, for example, application containers 122a, 122b, 122c may comprise Java™ virtual machines capable of supporting execution of logic in Java™ objects/actors. A set of state data is distributed across caches 124a, 124b, 124c. Information describing which portions of state data are cached in which cache 124a, 124b, 124c is maintained in location data 130. Each of cache 124a, 124b, 124c can include a subset of a database and/or file system data sets stored in memory.

Event broker 110 is operative to dispatch instructions to execution platform 106 in response to particular events published by protocol adapter 104, such that an application is instantiated one or more of application containers 122a, 122b, 122c for executing logic related to the event. Event broker 110 includes a co-location module 114 which has access to location data 130. Event broker utilizes location data 130 so that when it dispatches instructions to execution platform 106 in response to particular events, the application is instantiated in the one of application containers 122a, 122b, or 122c co-located with the cache 124a, 124b, 124c wherein state data required by the application is cached, thereby obviating the need to fetch such state data from database 126a, 126b, or 126c or another application server, and thereby reducing latency of execution of the application. The application containers 122a, 122b, 122c can be, for example, particular Java™ virtual machines running on application servers 120a, 120b, 120c. The applications can be for example, Java™ objects/actors which implement execution of logic related to the event.

Figure 2:
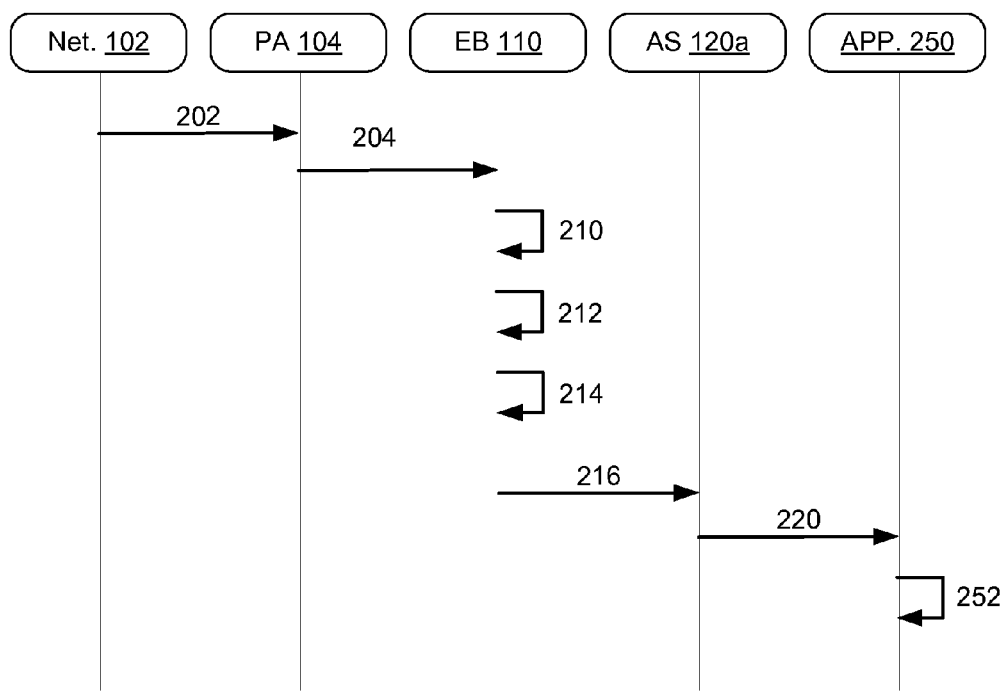
FIG. 2, shows flow in a system for runtime co-location of executing logic and frequently-accessed application data, in accordance with an embodiment of the invention.

FIG. 2, shows flow in a system for runtime co-location of executing logic and frequently-accessed application data, in accordance with an embodiment of the invention. As shown in FIG. 2, at step 202 an initial event occurs in network 102 (for example call initiation). At step 204, protocol adapter 104 publishes the event to event broker 110. At step 210, event broker 110 invokes a hash function to process attributes of the event, including for example a subscriber identifier. At step 212, event broker 110 matches router criteria with the event attributes, for example the subscriber identifier. At step 214, event broker 110 identifies a selected application server based on the router criteria and event attributes. The above steps are processed locally and therefore have low latency. At step 216, event broker 110 dispatches the event to a selected application server 120a. At step 220, application server 120a, instantiates, starts and/or resumes an instance of application 250 to execute logic related to the event. Application instantiation and event dispatching can be performed with a single network hop thereby providing low latency. At step 252, application 250 executes logic related to the event using state data co-located on application server 120a.

In particular embodiments, the application containers 122a, 122b, 122c can be, for example, particular Java™ virtual machines running on application servers 120a, 120b, 120c (see FIG. 1). The instance of application 250 can be for example a Java™ object/actor which implements execution of logic related to the event. Embodiments of the invention can be implemented as a new feature that eliminates the need for router actors (a Java™ object/actor which implements execution of routing logic) for most use cases. The embodiments of the invention are implemented using a simple declarative alternative which can be described generally as "upon any initial event matching type W and criteria X, create actor of type Y and dispatch logic to container Z." Instead of the event broker implementing a separate router actor, an extension to the actor deployment descriptor code allows the actor implementing the event logic to define its own routing rules. Thus, the actor which implements execution of logic related to the event can be dispatched in one step without first requiring creation and processing of a separate router actor which implements execution of routing logic. Advantages of this feature include: the router logic does not need to be a separate actor; the router logic can be multi-threaded resulting in less contention; there is no need for a pool of partitioned router actors; less code is required for the implementation; better and more even load balancing is provided; the router logic can be executed local to the protocol adapter; no context switch is required; no extra network hop is required to implement a router actor; and there is no need to use linked actors to co-locate with router actor.

The routing logic is, in one embodiment, defined in an actor deployment descriptor code expressed for example in XML (Extensible Markup Language). The actor deployment descriptor maps an event to an object/actor which implements the execution of logic related to the event. In accordance with an embodiment of the invention, the actor deployment descriptor also includes co-location settings. The co-location settings control co-location of the actor (an instance of application execution logic) with a specific storage cache and key. The co-location settings include the name of the cache to co-locate with (file system or database system) as defined in the storage service, and the key to co-locate with (for example subscriber identifier), as an event attribute name. The co-location setting can be file store or database store depending on where the relevant data is maintained (a file system or database system). The co-location setting also has an attribute which can be null, or set by a hash function which allows identification of a unique key, or it may be a constant for the event type. For example, in a telecommunications network, the unique key could be a subscriber identifier which allows identification/location of data regarding the subscriber and used for processing events relating to the subscriber. If the co-location setting is file store, the system will attempt to co-locate the actor with file store data identified by attribute (e.g. subscriber identifier). If the setting is database store, the system will attempt to co-locate the actor with database data identified by attribute (e.g. subscriber identifier).

Figure 3:
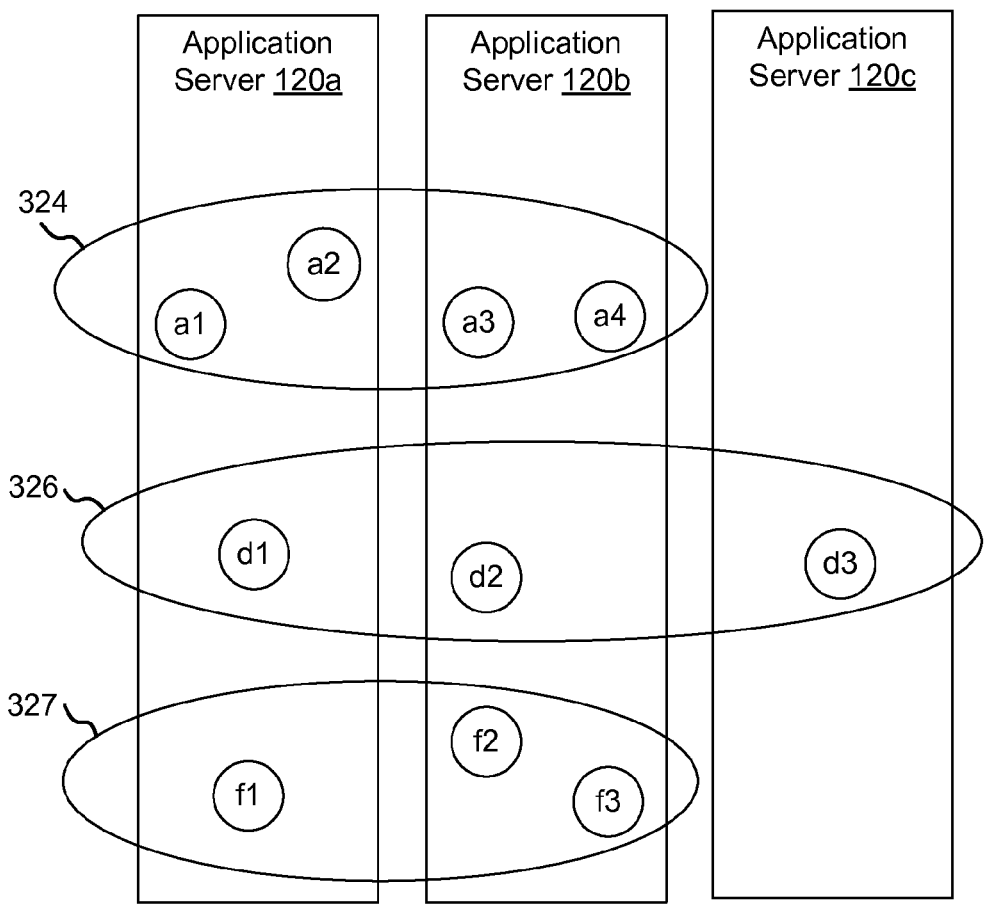
FIG. 3 illustrates an example of runtime co-location of executing logic and frequently-accessed application data, in accordance with an embodiment of the invention.

FIG. 3, shows an example deployment to illustrate the co-location feature. FIG. 3 shows three application servers 120a, 120b, 120c, an actor cache 324 hosting actors (execution logic/applications), a database storage service cache 326 and a file system storage service cache 327. In a preferred embodiment, the actor cache 324 is hosted on the same machines as the storage service cache data (database storage service cache 326 and file system storage service cache 327). Note that this is not always possible. FIG. 3 illustrates that the file system storage service cache 327 is on the same application servers 120a, 120b as the actor cache 324 whereas the database storage service cache 326 is not.

Referring again to FIG. 3, a1, a2, a3, a4 represent the unique keys for the actors, and d1, d2, d3, f1, f2, f3 represent the keys that are used to look up the entries in the respective storage service data (e.g. subscriber identifiers). In the example shown in FIG. 3, in the absence of a co-location setting, the actor identifier will be randomly dispatched such that the actor could be established on any one of the application servers 120a, 120b, that host the actor cache. Thus, the actor might need to fetch data from a different server or hop servers in order to perform a transaction, leading to increased latency. The co-location setting allows the system to selectively dispatch an actor in order to co-locate the actor with particular frequently accessed state data as determined from the setting and attribute. This allows, for example, co-locating the execution logic with cached data associated with the subscriber identifier in response to an event associated with a subscriber identifier. Co-locating execution logic on the same application server as the data subset which includes the state data associated with a subscriber identifier and required by the execution logic, in accordance with embodiments of the invention described herein, provides predictable latency and low latency for all requests thereby ensuring that substantially all requests are executed below a latency threshold (for example 50 milliseconds).

If the co-location setting is set to file store, when an inbound event arrives, the system will get the value for a co-location key attribute. If the attribute is null, the actor will be randomly dispatched (same result as no co-location setting) such that the actor could be established on any one of the application servers 120a, 120b, that host the actor cache. If the attribute value is f1, the actor will be dispatched to application server 120a. If the attribute value is f2 or f3, the actor will be dispatched to application server 120b. Thus, the actor is co-located with the relevant file-store data to reduce or eliminate the need to fetch data from a different server or hop servers in order to perform a transaction, leading to predictable and low latency.

If the co-location setting is set to database store, when an inbound event arrives, the system will get the value for a co-location key attribute. If the attribute is null, the actor will be randomly dispatched (same result as no co-location setting) such that the actor could be established on any one of the application servers 120a, 120b, that host the actor cache 324. If the attribute value is d1, the actor will be dispatched to application server 120a. If the value is d2, the actor will be dispatched to application server 120b. Thus, the actor is co-located with the relevant database store data to reduce or eliminate the need to fetch data from a different server or hop servers in order to perform a transaction, leading to predictable and low latency. If the value is d3, co-location is not possible because the actor cache 324 does not extend onto application server 120c. Thus, the actor will be randomly dispatched (same result as no co-location setting) such that the actor could be established on any one of the application servers 120a, 120b.

Figure 4:
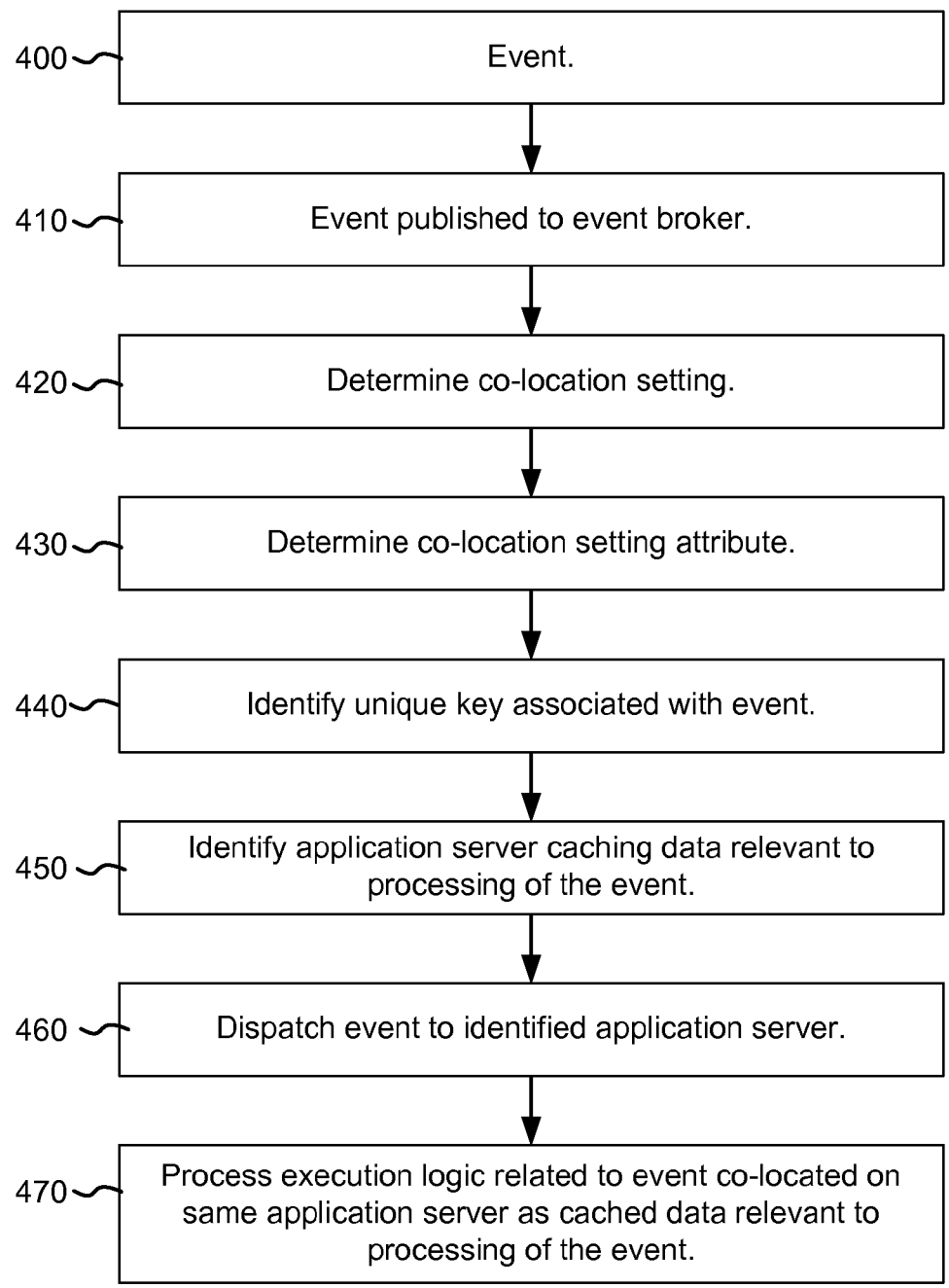
FIG. 4 shows a method for runtime co-location of executing logic and frequently-accessed application data, in accordance with an embodiment of the invention.

FIG. 4 shows a method for runtime co-location of executing logic and frequently-accessed application data, in accordance with an embodiment of the invention. At step 400, a trigger event occurs. At step 410, a protocol adapter published the event to an event broker. At step 420, the event broker determines a co-location setting for execution logic to be established to perform actions related to the event. At step 430, the event broker determines the attribute of the co-location setting. At step 440, if required by the co-location setting and attribute, the event broker identifies the unique key associated with the event utilizing, for example, a hash function. At step 450 the event broker identifies the location of an application server where data associated with the unique key is cached in memory. At step 460, the event broker dispatches execution logic to the identified application server. At step 470, execution logic related to the event is processed on the same application server as the cached data relevant to processing of the event. Co-locating execution logic on the same application server as the data subset which includes the state data required by the execution logic, in accordance with embodiments of the invention described herein, provides predictable latency and low latency for all requests thereby ensuring that substantially all requests are executed below a latency threshold (for example 50 milliseconds).

The present invention may be conveniently implemented using one or more conventional general purpose or specialized digital computer, computing device, machine, or microprocessor, and/or network of same, programmed according to the teachings of the present disclosure.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for co-location of execution logic related to an event with data used by the event for execution in a distributed processing environment having a plurality of application servers, the system comprising:

an event broker, executing on one or more microprocessors;
a data set distributed over said plurality of application servers such that each of said plurality of application servers hosts a data subset of said data set;
location data relating a plurality of keys to said data subsets; and
a co-location module;
wherein in response to said event broker receiving an event associated with a particular key of said plurality of keys, the co-location module:
determines one or more of the plurality of application servers hosting an actor cache associated with the event;
utilizes the location data to identify which of said plurality of application servers hosts a particular data subset related to said particular key,
selectively dispatches execution logic related to said event to an identified application server within the one or more application servers that hosts both the actor cache and the particular data subset related to the particular key, for executing the event at that application server using the particular data subset in accordance with both the actor cache and the particular data subset being located on that application server; and
responsive to the particular data subset being located on an application server other than an application server hosting the actor cache, selectively dispatches the execution logic to another of the one or more application servers that hosts the actor cache.

2. The system of claim 1, wherein:
the system is a telecommunications system:
the plurality of keys are unique keys associated with subscriber identifiers; and
the particular data subset comprises state data required by the event for executing the event at the identified application server.

3. The system of claim 1, wherein the event broker operates on an event broker server remote from said plurality of application servers and wherein the execution logic is dispatched to the identified application server from the event broker server using a single network hop.

4. The system of claim 1, wherein the system further comprises a co-location setting associated with the execution logic, and wherein the co-location setting specifies processing to identify the key.

5. The system of claim 1, wherein the system further comprises a hash function for identifying a key associated with an event.

6. The system of claim 1, wherein the system further comprises:
a co-location setting associated with the execution logic, and wherein each said key of the plurality of keys is an attribute of the co-location setting and,
wherein, in response to said event broker receiving an event associated with a particular key of said plurality of keys, the co-location module utilizes the co-location setting and the location data to identify which of said plurality of application servers hosts the data subset related to said key, and dispatches execution logic related to said event to the identified application server.

7. The system of claim 1, wherein the system is a telecommunications system and the plurality of keys are unique keys associated with subscriber identifiers and wherein the system further comprises a hash function for identifying a unique key associated with an event.

8. A method for co-locating execution logic related to an event with data used by the event for execution in a distributed processing environment having a plurality of application servers, the method comprising:
- providing an event broker, executing on one or more microprocessors;
- providing location data relating a plurality of keys to data subsets stored in memory in different of said plurality of application servers;
- receiving an event with the event broker wherein the event is associated with an identified key of said plurality of keys;
- determining one or more of the plurality of application servers hosting an actor cache associated with the event;
- identifying from said location data an identified application server hosting a particular data subset related to said identified key;
- selectively dispatching execution logic related to said event to an identified application server within the one or more application servers that hosts both the actor cache and the particular data subset related to the particular key, for executing the event at that application server using the particular data subset in accordance with both the actor cache and the particular data subset being located on that application server; and
- responsive to the particular data subset being located on an application server other than an application server hosting the actor cache, selectively dispatching the execution logic to another of the one or more application servers that hosts the actor cache.

9. The method of claim 8, wherein the distributed processing environment is a telecommunications network services system and wherein the receiving the event comprises receiving an event with the event broker wherein the event is associated with an identified key of said plurality of keys, wherein the identified key is associated with a subscriber identifier.

10. The method of claim 8, wherein the dispatching the execution logic further comprises dispatching execution logic related to said event to said identified application server, using a single network hop.

11. The method of claim 8, wherein:
- the receiving the event comprises receiving an event with the event broker wherein the event is associated with an identified key of said plurality of keys, further comprises identifying a co-location setting associated with the event; and
- wherein the identifying the identified application server further comprises identifying from a co-location setting and said location data an identified application server hosting the data subset related to said identified key.

12. The method of claim 8, wherein the receiving the event further comprises identifying an identified key associated with said event.

13. The method of claim 8, wherein the receiving the event further comprises identifying an identified key associated with said event using a hash function.

14. The method of claim 8, wherein the distributed processing environment is a telecommunications network services system and wherein the receiving the event further comprises identifying a subscriber identifier associated with said event using a hash function.

15. A non-transitory computer readable storage medium including instructions stored thereon which, when executed by a computer, cause the computer to perform a method comprising:
- providing an event broker;
- providing location data relating a plurality of keys to data subsets stored in memory in different of said plurality of application servers;
- receiving an event with the event broker wherein the event is associated with an identified key of said plurality of keys;
- determining one or more of the plurality of application servers hosting an actor cache associated with the event;
- identifying from said location data an identified application server hosting a particular data subset related to said identified key;
- selectively dispatching execution logic related to said event to an identified application server within the one or more application servers that hosts both the actor cache and the particular data subset related to the particular key, for executing the event at that application server using the particular data subset in accordance with both the actor cache and the particular data subset being located on that application server; and
- responsive to the particular data subset being located on an application server other than an application server hosting the actor cache, selectively dispatching the execution logic to another of the one or more application servers that hosts the actor cache.

16. The non-transitory computer readable storage medium of claim 15 wherein the dispatching comprises dispatching uses a single network hop.

17. The non-transitory computer readable storage medium of claim 15, wherein:
- the receiving further comprises identifying a co-location setting associated with the event; and
- the identifying further comprises identifying, from the co-location setting and said location data, an identified application server hosting the particular data subset related to said identified key.

18. The non-transitory computer readable storage medium of claim 15, wherein the receiving further comprises identifying an identified key associated with said event using a hash function.

19. The non-transitory computer readable storage medium of claim 15, wherein the receiving further comprises identifying a subscriber identifier associated with said event.

20. The non-transitory computer readable storage medium of claim 15, wherein the identifying further comprises:
- identifying a co-location setting associated with the event;
- identifying an identified key associated with said event; and
- identifying, from co-location setting and said location data, an identified application server hosting the particular data subset related to said identified key.

* * * * *